US010965566B2

(12) United States Patent
Nayak et al.

(10) Patent No.: US 10,965,566 B2
(45) Date of Patent: Mar. 30, 2021

(54) SYSTEM AND METHOD FOR DETECTING CHANGES IN CLOUD SERVICE UP-TIME

(71) Applicant: INTERNATIONAL BUSINESS MACHINES CORPORATION, Armonk, NY (US)

(72) Inventors: Harish Nayak, Bangalore (IN); Rajat Verma, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 119 days.

(21) Appl. No.: 15/802,598

(22) Filed: Nov. 3, 2017

(65) Prior Publication Data
US 2019/0140926 A1 May 9, 2019

(51) Int. Cl.
*G06F 9/50* (2006.01)
*H04L 12/24* (2006.01)
*H04L 12/26* (2006.01)

(52) U.S. Cl.
CPC ...... *H04L 43/0811* (2013.01); *H04L 41/0668* (2013.01); *H04L 41/0806* (2013.01);
(Continued)

(58) Field of Classification Search
CPC . H04W 72/04; H04W 72/0406; H04W 28/14; H04W 4/024; H04W 4/70;
(Continued)

(56) References Cited

U.S. PATENT DOCUMENTS

| 7,930,398 B2 * | 4/2011 | Kawato | G06F 9/5027 709/226 |
| 8,005,933 B2 * | 8/2011 | Brown | G06F 15/173 709/223 |

(Continued)

FOREIGN PATENT DOCUMENTS

| CN | 103902442 A | 7/2014 |
| CN | 106603336 A | 4/2017 |

(Continued)

OTHER PUBLICATIONS

Mell et al., "The NIST Definition of Cloud Computing," National Institute of Standards and Technology, U.S Department of Commerce, Special Publication 800-145, Sep. 2011, pp. 1-7.

*Primary Examiner* — Tonia L Dollinger
*Assistant Examiner* — Linh T. Nguyen
(74) *Attorney, Agent, or Firm* — Erik K. Johnson (57) ABSTRACT

A method for detecting cloud service uptime for a cloud service on a cloud service provider, by means of a cognitive agent. The method includes receiving, by the cognitive agent, a cloud service request from a client, and determining the cloud service uptime based on a cloud service uptime model. The method further includes preventing the cloud service request from the client if it is determined that the cloud service uptime exceeds a given threshold, and transmitting, by the cognitive agent, cloud service uptime details to the client. The method further includes requesting a provisioning of a cloud service if it is determined that the cloud service uptime does not exceed the given threshold.

(Continued)

The method further includes training, by the cognitive agent, the cloud service uptime model based on a dynamic polling of the cloud service, wherein the cloud service uptime model provides an optimal response to the client.

20 Claims, 8 Drawing Sheets (52) U.S. Cl.
CPC ...... *H04L 43/0817* (2013.01); *H04L 43/0876* (2013.01); *H04L 43/10* (2013.01); *H04L 43/103* (2013.01); *G06F 9/5027* (2013.01); *H04L 41/5019* (2013.01); *H04L 43/06* (2013.01); *H04L 43/0805* (2013.01); *H04L 43/16* (2013.01)

(58) Field of Classification Search
CPC ...... H04W 84/04; G06F 8/65; G06F 2201/81; G06F 2201/88; G06F 2209/5019; G06F 9/505; G06F 11/328; G06F 11/3428; G06F 11/3447; G06F 11/3466; G06F 2201/815; G06F 3/0647; G06F 9/50; G06F 16/972; G06F 9/5011; G06F 2209/506; G06F 2209/503; G06F 11/3055; G06F 2009/4557; G06F 11/3051; G06F 11/3058; G06F 11/2025; G06F 2209/501; G06F 16/2455; G06F 16/8373; G06F 11/30; G06F 11/3409; G06F 11/3452; G06F 2201/86; H04L 47/827; H04L 67/10; H04L 43/04; H04L 47/822; H04L 47/1277; H04L 47/20; H04L 47/2475; H04L 41/50; H04L 43/08; H04L 41/5019; H04L 65/80; H04L 41/5003; H04L 43/0805; H04L 41/0631; H04L 43/0876; H04L 43/10; H04L 43/103; H04L 43/16; H04L 47/70; H04L 63/126; G06N 20/00; G06N 3/02; G06N 3/0454; G05B 19/4183; G05B 23/0283; G05B 13/028; G05B 19/4184; G05B 19/1845; G05B 19/41865; G05B 19/41875; G05B 2219/32287; G05B 2219/35001; G05B 2219/37337; G05B 2219/37351; G05B 2219/37434; G05B 2219/40115; G05B 2219/45004; G05B 2219/45129; G05B 23/0221; G05B 23/0229; G05B 23/024; G05B 23/0264; G05B 23/0286; G05B 23/0289; G05B 23/0291; G05B 23/0294; G05B 23/0297; G05B 19/042; G05B 19/054; G05B 19/4155; G05B 2219/1134; G05B 2219/31156; G05B 2219/31282; G05B 2219/33039
USPC .................................. 709/203, 219, 224–226
See application file for complete search history.

(56) References Cited

U.S. PATENT DOCUMENTS

| | | | | |
|---|---|---|---|---|
| 2008/0307036 A1* | 12/2008 | Mishra et al. | .......... | G06F 15/16 709/203 |
| 2009/0320029 A1* | 12/2009 | Kottomtharayil | ... | G06F 11/1461 718/102 |
| 2011/0295999 A1* | 12/2011 | Ferris | .................... | G06F 9/5072 709/224 |
| 2012/0030684 A1* | 2/2012 | Meng | ........................ | G06F 9/50 718/104 |
| 2012/0130873 A1* | 5/2012 | Morgan | ................. | G06Q 30/00 705/34 |
| 2012/0131594 A1* | 5/2012 | Morgan | ................... | G06F 9/46 718/105 |
| 2013/0159068 A1* | 6/2013 | Chang | .............. | G06Q 10/06313 705/7.41 |
| 2014/0075005 A1 | 3/2014 | Tung et al. | | |
| 2014/0136295 A1* | 5/2014 | Wasser | .................... | G06Q 30/02 705/73.8 |
| 2014/0269275 A1* | 9/2014 | Jun | ........................ | H04W 36/22 370/230 |
| 2014/0279581 A1* | 9/2014 | Devereaux | .......... | G06Q 50/184 705/310 |
| 2015/0074450 A1* | 3/2015 | Blount | ................ | G06F 11/0727 714/6.1 |
| 2015/0156095 A1* | 6/2015 | Lu | ......................... | H04L 47/781 709/224 |
| 2016/0094483 A1* | 3/2016 | Johnston | ............... | H04L 12/911 709/226 |
| 2016/0128083 A1* | 5/2016 | Shakya | ................ | G06F 9/5072 455/406 |
| 2017/0235606 A1* | 8/2017 | Cherniavsky | ............. | G06F 9/50 718/104 |
| 2018/0018129 A1* | 1/2018 | Nikaido | ................. | G06F 13/00 |
| 2018/0246767 A1* | 8/2018 | Abali | ................ | G06Q 10/06314 705/7.22 |
| 2018/0316626 A1* | 11/2018 | Tian | ....................... | H04L 47/803 |
| 2020/0027014 A1* | 1/2020 | Wen | .......................... | G06F 9/50 |

FOREIGN PATENT DOCUMENTS

| WO | WO-2007061824 A1 * | 5/2007 | ............ H04L 47/10 |
|---|---|---|---|
| WO | 2014200836 A1 | 12/2014 | |

* cited by examiner

```
{
PrivateServiceName: SampleEmailClient.samplecompany.com,
PublicServiceName : WebEmailService,
URL: www.webmail.com
UserName: user,
Password: XXXXX,
HeartBeatFrequency: 5 Seconds,
LastDownTime: Saturday, January 23, 2013 11:07:18 AM ,
LastHeartBeat: Saturday, September 28, 2017 11:07:15 PM
}
```

SYSTEM AND METHOD FOR DETECTING CHANGES IN CLOUD SERVICE UP-TIME

BACKGROUND

The present disclosure relates generally to the field of cloud computing, and more particularly to data processing and management of cloud server service uptime in a hybrid cloud computing environment.

Cloud computing is a form of internet-based computing that provides shared computer processing resources and data to computers and other devices, on demand. It is a model for enabling ubiquitous, on-demand access to a shared pool of configurable computing resources (e.g. computer networks, servers, storage, applications, and services) which can be rapidly provisioned and released with minimal management effort.

Cloud computing allows users and enterprises, with various capabilities, to store and process their data in either a privately owned cloud, or on a public cloud (i.e. a third-party server), in order to make data accessing mechanisms much more easy and reliable.

A hybrid cloud is an integrated cloud service utilizing both private and public clouds to perform distinct functions within the same organization, with orchestration between the two platforms. By allowing workloads to move between private and public clouds as computing needs and costs change, hybrid clouds give businesses greater flexibility and more data deployment options. For example, an enterprise can deploy an on-premises private cloud to host sensitive or critical workloads, but use a third-party public cloud service provider to host less critical resources, such as test and development workloads. A software layer can facilitate private cloud connections to the public cloud.

Occasionally, due to unforeseen reasons, the services of public cloud service providers can be down. This may lead the cloud consumers to be impacted while the cloud services are down, which may in turn lead to lost business opportunities and wasted resources for both the public cloud service provider and the cloud consumer.

SUMMARY

Embodiments of the invention include a method, computer program product, and system, for detecting changes in access to a cloud service, by means of a cognitive agent. According to an embodiment, a computer-implemented method for detecting cloud service uptime for a cloud service on a cloud service provider, by means of a cognitive agent, is disclosed. The method receives, by the cognitive agent, an uptime query from a client and determines the cloud service uptime based on a cloud service uptime model. The method further prevents execution of a cloud service request from the client if it is determined that the cloud service uptime exceeds a given threshold, and transmits, by the cognitive agent, cloud service uptime details to the client.

A computer program product, according to an embodiment of the invention, includes a non-transitory tangible storage device having program code embodied therewith. The program code is executable by a processor of a computer to perform a method. The method receives, by the cognitive agent, an uptime query from a client and determines the cloud service uptime based on a cloud service uptime model. The method further prevents a cloud service request from the client if it is determined that the cloud service uptime exceeds a given threshold, and transmits, by the cognitive agent, cloud service uptime details to the client.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method receives, by the cognitive agent, an uptime query from a client and determines the cloud service uptime based on a cloud service uptime model. The method further prevents a cloud service request from the client if it is determined that the cloud service uptime exceeds a given threshold, and transmits, by the cognitive agent, cloud service uptime details to the client.

DETAILED DESCRIPTION

Hybrid clouds are particularly valuable for dynamic or highly changeable workloads. For example, a company may use a hybrid cloud storage to retain its accumulated business, sales, test and other data, and then run analytical queries in the public cloud, which can scale to support demanding distributed computing tasks. Public cloud's flexibility and scalability eliminates the need for a company to make massive capital expenditures to accommodate short-term spikes in demand. The public cloud provider supplies compute resources, and the company only pays for the resources it consumes. To connect private and public cloud resources, this model requires a hybrid cloud environment.

Public cloud servers may be configured to provide levels of performance, security, and control similar to those of a dedicated server. Instead of being hosted on physical hardware that is solely dedicated to a user, public cloud servers reside on a shared "virtualized" environment that is managed by a public cloud hosting provider. In essence, clients of a public cloud hosting provider are renting virtual server space rather than renting or purchasing physical servers. Oftentimes, public cloud hosting providers are paid for by the hour, depending on the capacity required at any particular time.

A public cloud service provider, or cloud provider, is a company that offers some component of cloud computing such as Infrastructure as a Service (IaaS), Software as a Service (SaaS), or Platform as a Service (PaaS) to other businesses or individuals.

Cloud brokerage entails integrating public and private clouds and providing a uniform platform to customers in order to provision resources on any of the public or private clouds. Publicly available Application Programming Interfaces (APIs) are used for performing the actions on a cloud provider portal.

A cloud broker is an entity that manages the use, performance and delivery of cloud services, and negotiates relationships between cloud providers and cloud consumers. As cloud computing evolves, the integration of cloud services may be too complex for cloud consumers to manage alone. In such cases, a cloud consumer may request cloud services from a cloud broker, instead of contacting a cloud provider directly.

In general, cloud brokers provide services in three categories: aggregation, arbitrage, and intermediation. Aggregation is when a cloud broker combines and integrates multiple services into one or more new services. Service arbitrage means a broker has the flexibility to choose services from multiple cloud service providers, depending upon the characteristics of the data or the context of the service. Intermediation is when a cloud broker enhances a given service by improving some specific capability and providing value-added services to cloud consumers. The improvement can be managing access to cloud services, identity management, performance reporting, enhanced security, etc.

Occasionally, due to unforeseen reasons such as site maintenance and high traffic volume for example, the services of public cloud service providers can be down. This may lead the cloud consumers to be impacted while the cloud services are down, which may in turn lead to lost business opportunities for both the public cloud service provider and the cloud consumer. Still being in a stage of infancy, cloud computing services are seeking to provide more reliable and user-friendly experiences.

Due to the above-mentioned unforeseen reasons for the services of public cloud service providers to be down, the present invention discloses a method to provide a more informative and reliable user-friendly cloud computing experience, for example by informing and bringing awareness of the problem to the cloud service consumer by implementing a cognitive agent in order to pro-actively inform the cloud service consumer about the downtime, or availability, of a service on the cloud.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not be to scale.

Figure 1:
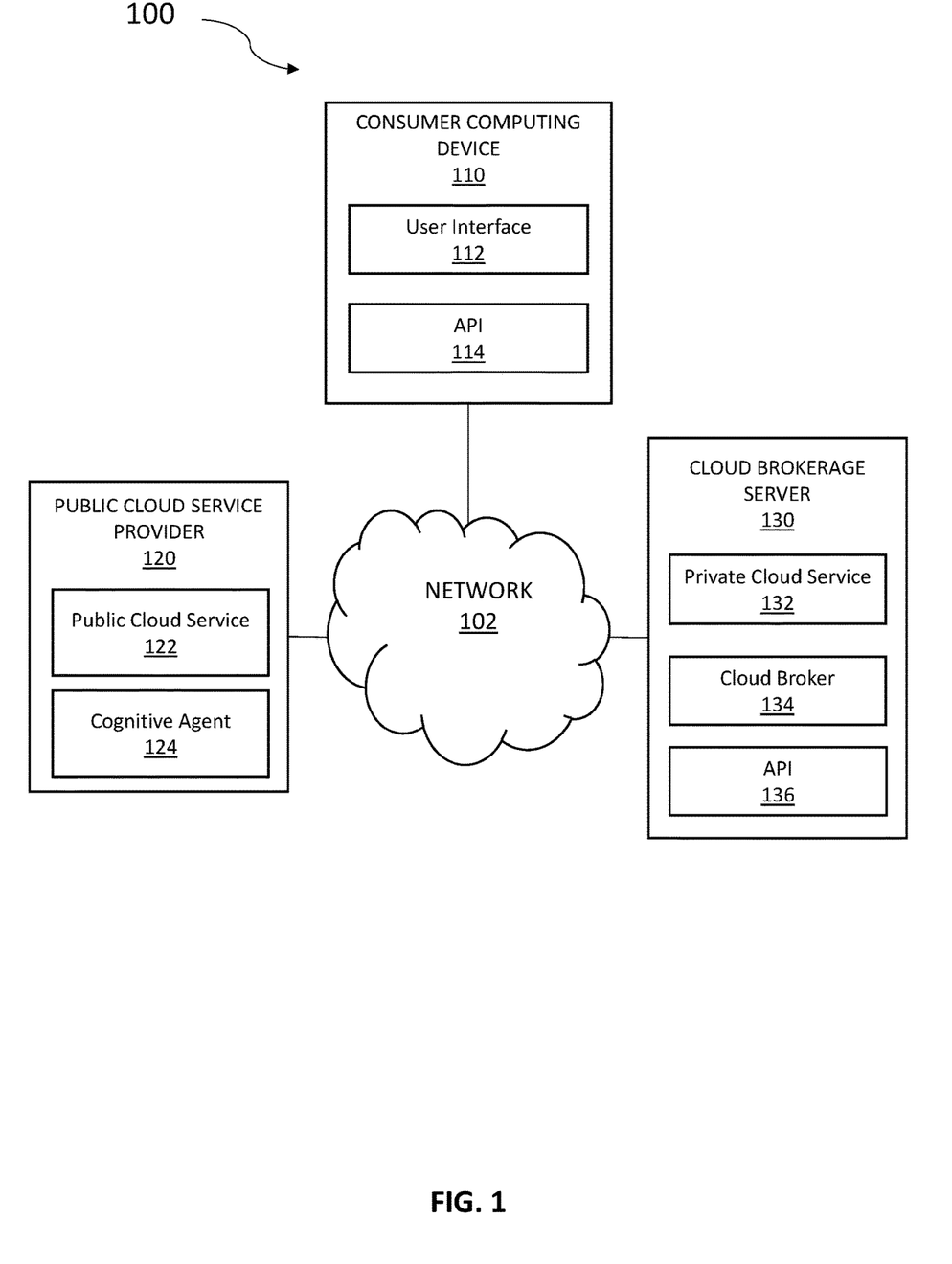
FIG. 1 illustrates a hybrid cloud computing environment 100, in accordance with an embodiment of the present invention.

FIG. 1 illustrates a hybrid cloud computing environment 100, according to an embodiment of the present invention.

Hybrid cloud computing environment 100 includes consumer computing device 110, public cloud service provider 120, and cloud brokerage server 130, all connected via network 102. The setup in FIG. 1 represents an example embodiment configuration for the present invention, and is not limited to the depicted setup in order to derive benefit from the present invention.

In the example embodiment, consumer computing device 110 contains user interface 112 and application programming interface (API) 114. In various embodiments, consumer computing device 110 may be a laptop computer, tablet computer, netbook computer, personal computer (PC), a desktop computer, a personal digital assistant (PDA), a smart phone, or any programmable electronic device capable of communicating with public cloud service provider 120, and private cloud service provider 130 via network 102. Consumer computing device 110 may include internal and external hardware components, as depicted and described in further detail below with reference to FIG. 6. In other embodiments, consumer computing device 110 may be implemented in a cloud computing environment, as described in relation to FIGS. 7 and 8, herein. Consumer computing device 110 may also have wireless connectivity capabilities allowing it to communicate with public cloud service provider 120, and cloud brokerage server 130, and other computers or servers over network 102.

In the example embodiment, consumer computing device 110 includes user interface 112, which may be a computer program that allows a user to interact with consumer computing device 110 and other connected devices via network 102. For example, user interface 112 may be a graphical user interface (GUI). In addition to comprising a computer program, user interface 112 may be connectively coupled to hardware components, such as those depicted in FIG. 6, for receiving user input. In the example embodiment, user interface 112 is a web browser, however in other embodiments user interface 112 may be a different program capable of receiving user interaction and communicating with other devices.

In an exemplary embodiment, API 114 refers to a set of clearly defined methods of communication between various software components, or cloud services, and may be for a web-based system, operating system, database system, computer hardware or software library. An API 114 specification can take many forms, but often includes specifications for routines, data structures, object classes, variables, or remote calls. Just as a GUI makes it easier for a user to use programs, APIs make it easier for developers to use certain technologies in building, or accessing, applications. By abstracting the underlying implementation and only exposing objects or actions the developer needs, an API simplifies programming.

There are various APIs 114 known to one of ordinary skill in the art, which may include remote APIs or web APIs. A remote API allows developers to manipulate remote resources through protocols, regardless of language or platform. For example, the Java Database Connectivity API allows developers to query many different types of databases with the same set of functions, while the Java remote method invocation API uses the Java Remote Method Protocol to allow invocation of functions that operate remotely, but appear local to the developer.

A web API is a defined interface through which interactions occur between an enterprise and applications that use its assets. In an exemplary embodiment, a web API 114 is the defined interface through which an interaction happens between a private cloud service 136 and a public cloud service 124, and may provide programmable interfaces for a set of public cloud services 124 serving different types of private consumers. A web API may typically be defined as a set of Hypertext Transfer Protocol (HTTP) request messages, along with a definition of the structure of response messages, which is usually in an Extensible Markup Language (XML) or JavaScript Object Notation (JSON) format.

In the example embodiment, public cloud service provider 120 contains public cloud service 122 and cognitive agent 124. Public cloud service provider 120 may include cloud infrastructure such as networks, servers, operating systems, storage, and individual applications which allows the consumer to derive benefit from multiple existing technologies without the need for deep knowledge about, or expertise, with each one.

Public cloud service provider 120, in the exemplary embodiment, may also leverage concepts from utility computing to provide metrics for the services used. Such metrics are at the core of the public cloud pay-per-use models. Additionally, measured services are an essential part of the feedback loop in autonomic computing, allowing services to scale on-demand and to perform automatic failure recovery.

In an exemplary embodiment, public cloud service 122 refers to resources made available to the public, via a public cloud service provider 120, over the internet such as virtual machines (VMs), applications or storage. In various embodiments, public cloud service provider 120 may include various public cloud service 122 models such as: Software as a Service (SaaS), in which a third-party provider hosts applications and makes them available to customers over the internet; Platform as a Service (PaaS), in which a third-party provider delivers hardware and software tools, usually those needed for application development, to its users as a service; and Infrastructure as a Service (IaaS), in which a third-party provider offers virtualized computing resources, such as VMs and storage, over the internet.

In the exemplary embodiment, public cloud service provider 120 may implement a cognitive agent 124 on public cloud service provider 120. Cognitive agent 124 may be capable of pro-actively informing public cloud service customers about downtime/availability of a public cloud service 122 on the public cloud service provider 120 by polling the cloud services 122 on public cloud service provider 120 at a configurable, or dynamic, interval. The polling interval may be dynamic in nature and vary depending on the cloud service type being polled. Dynamic in nature may indicate a polling of one or more different cloud service types at one or more configurable intervals. For instance, the polling may be configured proportional to the frequency of downtime of services on public cloud service provider 120. The higher the frequency of downtime, the more frequent would be the polling via cognitive agent 124, and vice versa. In alternative embodiments, cognitive agent 124 may continuously poll a cloud service 122 during various times of day, days of the week, weeks of the month, months of the year, on Federal Holidays, during natural disasters and so forth, thus providing more data to train a cloud service uptime model, as later discussed herein.

Once cognitive agent 124 has polled the cloud services for their up-time, it may become easy and predictable for the consumers of the public cloud service to get a binary bit response (i.e. low payload) from cognitive agent 124, before the consumer tries to access public cloud service 122 itself to get the actual sought after data. In this fashion, cognitive agent 124 acts like a pseudo-gatekeeper and informs the consumer about the availability of public cloud service 122 at a particular time, prior to public cloud service 122 actually being used by the consumer.

In an exemplary embodiment, cognitive agent 124 may consolidate and analyze the received up-time for various public cloud services 122, over an extended period of time, and present a pattern of how the public cloud services 122 are frequently used, for what durations, and for what parts of the day/week/month/year. Cognitive agent 124 may use this consolidated and analyzed data to optimize its caching functionality and provide an optimal response to the consumer regarding a public cloud service 122 uptime, in order to improve reliability and notice.

With continued reference to FIG. 1, cloud brokerage server 130 contains private cloud service 132, cloud broker 134, and API 136. In various embodiments, cloud brokerage server 130 may be a laptop computer, tablet computer, netbook computer, personal computer (PC), a desktop computer, a personal digital assistant (PDA), a smart phone, or any programmable electronic device capable of communicating with consumer computing device 110 and public cloud service provider 120 via network 102. Cloud brokerage server 130 may be implemented in a cloud computing environment, as described in relation to FIGS. 7 and 8, herein.

In an exemplary embodiment, private cloud service 132 refers to resources made available to a private enterprise or user, via private cloud brokerage server 130, over the internet such as virtual machines (VMs), applications or storage. In various embodiments, cloud brokerage server 130 may include various private cloud service 132 models such as: Software as a Service (SaaS), Platform as a Service (PaaS), and Infrastructure as a Service (IaaS).

In an exemplary embodiment, cloud broker 134 may be a software application, on cloud brokerage server 130, that provides a single point of entry to manage/facilitate the distribution of work between different public cloud service providers 120. Cloud broker 134 may also be referred to as a cloud agent. For example, cloud broker 134 may connect enterprises to the appropriate public cloud service provider 120 based on whether they need infrastructure, software, platform or specific customizations. The two important unique features of cloud broker 134 are: (1) the ability to provide a single consistent interface to multiple differing public cloud service providers 120; and (2) the clear visibility that cloud broker 134 allows into which company is providing the public cloud services 122 in the background. In alternative embodiments, cloud broker 134 may be incorporated on a user device, public cloud service provider 120, and cloud brokerage server 130.

In an exemplary embodiment, API 136 refers to a set of clearly defined methods of communication between public cloud service provider 120 and cloud brokerage server 130. In alternative exemplary embodiments, API 136 may refer to a set of clearly defined methods of communication between various software components, or cloud services, and may be for a web-based system, operating system, database system, computer hardware or software library. An API 136 specification can take many forms, but often includes specifications for routines, data structures, object classes, variables, or remote calls.

Cloud broker 134 may receive input from cognitive agent 124 reporting on the health of API 136. The health of API 136 refers to whether the API for a particular public cloud service 122 is suffering downtime (e.g. maintenance, disruption, high traffic) or whether it is available to perform.

Cloud broker 134, in an exemplary embodiment, communicates with public cloud service provider 120 to provision a public cloud service 122.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between consumer computing device 110, public cloud service provider 120, and cloud brokerage server 130.

Figure 2:
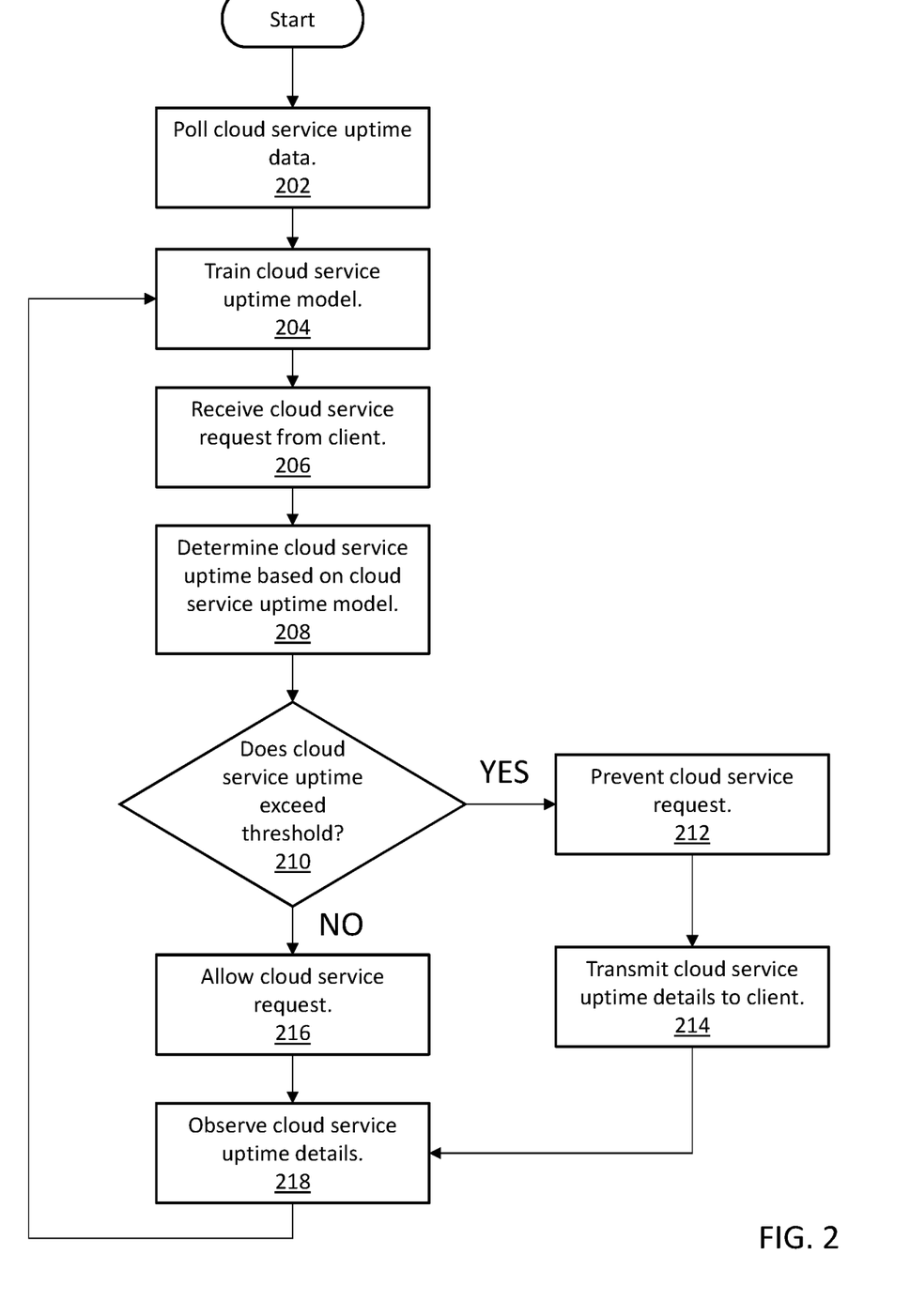
FIG. 2 is a flowchart illustrating the operation of cognitive agent 124 of FIG. 1, in accordance with an embodiment of the present invention.

FIG. 2 is a flowchart illustrating the operation of cognitive agent 124 of FIG. 1, in accordance with an embodiment of the present invention.

Figure 3:
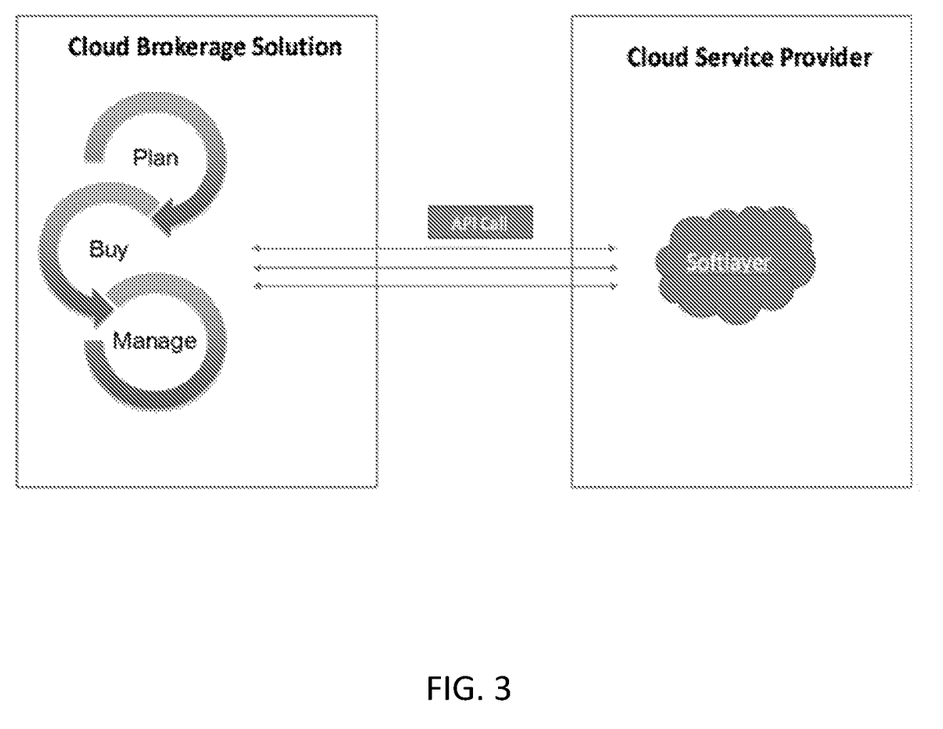
FIG. 3 illustrates an existing implementation of a hybrid cloud client making an API call to a public cloud service provider 120, in accordance with an embodiment of the present invention.

FIG. 3 depicts the existing implementation that a cloud broker 134 uses to communicate with a public cloud service provider 120. In the exemplary embodiment, cloud broker 134 may access a public cloud service 122 on public cloud service provider 120 by making an API request, or call, for service (e.g. VMs, storage, network, or cloud services) via API 136. In the event API 136 is modified or deleted from the support, or if the APIs are down due to maintenance, high traffic, and so forth, then provisioning fails. As a result, the cloud service and consumer have wasted money/time on the failed access request to the public cloud service provider 120.

Figure 4:
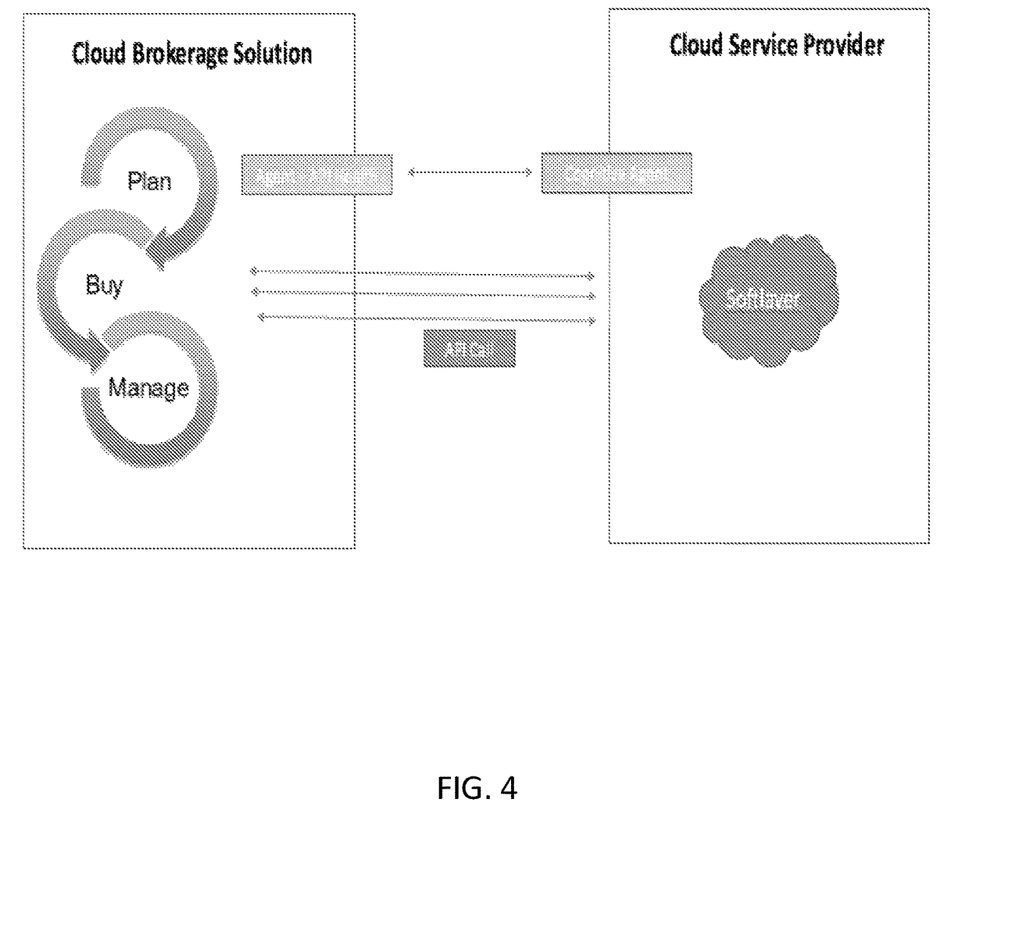
FIG. 4 illustrates the suggested approach for a hybrid cloud client to obtain a public cloud service 122 uptime, via a cognitive agent 124, prior to making an API call to a public cloud service provider 120, in accordance with an embodiment of the present invention.

FIG. 4 illustrates the suggested approach for a hybrid cloud client to obtain a public cloud service 122 uptime, via a cognitive agent 124, prior to making an API call to a public cloud service provider 120, in accordance with an embodiment of the present invention.

With reference to FIGS. 1, 2, and 4, cognitive agent 124 polls public cloud service 122 uptime on public cloud service provider 120 (step 202). In an exemplary embodiment, public cloud service provider 120 may contain a web-based public email service as a cloud service 122. Cognitive agent 124 may be capable of polling, or requesting a status of the web-based public email service in order to convey to the cloud service consumer, or the client, a frequency of availability of the services used, a duration, whether the service is currently available and so forth. In exemplary embodiments, some reasons why a cloud service 122 is unavailable for provisioning may be the APIs are down due to maintenance, high traffic, and so forth.

With continued reference to FIGS. 1, 2, and 4, cognitive agent 124 trains a cloud service uptime model for a particular public cloud service 122 based on a dynamic polling of the cloud service 122, wherein the cloud service uptime model assists in providing an optimal response to the cloud service client (step 204). In an exemplary embodiment, training a cloud service uptime model for a particular cloud service 122 (e.g. VMs, storage, and network or cloud services) may entail polling at various instances throughout a day, week, month, and year. For example, cognitive agent 124 may poll the web-based public email service at 11:52 am Monday morning and receive a response of high network traffic resulting in slower cloud service uptime. Likewise, cognitive agent 124 may poll the web-based public email service at 1 pm Wednesday afternoon and receive a response of low network traffic resulting in faster cloud service uptime. Cognitive agent 124 may poll the web-based public email service on Federal holidays and receive a response of low network traffic resulting in faster cloud service uptime.

The polling may be dynamic, meaning that it checks for a frequency of availability of the services used, a duration, whether the service is currently available and so forth. In exemplary embodiments, polling may take place on various days, at various times throughout the day, on various designated holidays throughout the month, on weekends, and on any other pre-configured, or random, dates/times in order to provide a broader picture of cloud service uptime details for a particular public cloud service 122. The greater the data points, or polling, the more accurate the cloud service uptime details may be for a given cloud service uptime request. Over time, the polling data for the web-based public email service is consolidated and analyzed by cognitive agent 124 to present a pattern on: how frequently the cloud service is used by the public; peak and off-peak hours for given days of the week/month/year; and average duration of use for the cloud service.

In an exemplary embodiment, cognitive agent 124 utilizes the gathered polling data for a particular cloud service 122 to optimize its caching functionality and to provide an optimal response to cloud service consumers.

In alternative embodiments, cloud service uptime details may be attained by configuring the public cloud services 122 to post their respective up-times, based on the polling configuration of cognitive agent 124. Once the respective up-times for the public cloud services 122 are posted, these values may be provided to the cloud service consumer, via consumer computing device 110, when the cloud service consumer queries a particular public cloud service 122 API cloud service up-time. In an exemplary embodiment, the polling configuration may be a default value, which would be changed dynamically depending on the frequency of the calls being made to public cloud service provider 120. The frequency of up-time data collection may be higher if the public cloud service 122 is frequently used compared to occasionally used public cloud services 122 (i.e. the frequently used public cloud services 122 would have a lesser time interval compared to the infrequently used public cloud services 122). In this fashion, the consumer would know about the up-time for a public cloud service 122 before making the actual call to the public cloud service provider 120 itself.

With continued reference to FIGS. 1, 2, and 4, public cloud service 122 receives a cloud service request from a cloud service consumer via cloud broker 134 (step 206).

With continued reference to FIGS. 1, 2, and 4, cognitive agent 124 determines a cloud service uptime, for a particular public cloud service 122, based on a cloud service uptime model (step 208). Cognitive agent 124 compares the time of the cloud service request to the cloud service uptime model to see what a typical uptime is under similar conditions. In an exemplary embodiment, a cloud service uptime model for a particular public cloud service 122 is dynamically changing based on continuous polling of the public cloud service 122, as previously discussed. The cloud service uptime model, in an exemplary embodiment, may be stored in memory on cognitive agent 124. In alternative embodiments, the cloud service uptime model may be stored on public cloud service provider 120, cloud brokerage server 130, or a separate server that has the ability to communicate with cognitive agent 124, on public cloud service provider 120, via network 102.

With continued reference to FIGS. 1, 2, and 4, if the cognitive agent 124 determines that the cloud service uptime for the public cloud service 122 exceeds a given threshold (step 210 YES), then the cognitive agent 124 prevents execution of the cloud service request from the cloud service consumer (step 212). In exemplary embodiments, a given threshold may be a pre-configured amount of time that a cloud service consumer is willing to wait for the cloud service uptime. In alternative embodiments, a given threshold may account for the amount of time that a cloud service 122 may process a cloud service request before timing out. With continued reference to the illustrative example above, if cognitive agent 124 reports that the cloud service uptime for the web-based public email service exceeds, for example, 150% or more of a typical daily uptime due to heavy traffic or site maintenance, then cognitive agent 124 may prevent execution of the request to the web-based public email service and preserve the cloud consumer's valuable resources, such as time and money.

In alternative embodiments, in the event the cloud service consumer does not get a positive response for its cloud service 122 request on public cloud service provider 120, the cloud service consumer would not make the actual, or final, call to the public cloud service 122, thereby saving the cost of a failed request. Moreover, cognitive agent 124 may inform the consumer about the unavailability of the queried public cloud service 122, via cloud broker 134.

With continued reference to FIGS. 1, 2, and 4, if cognitive agent 124 prevents execution of the cloud service request, then cognitive agent 124 may transmit the cloud service uptime details to the cloud service consumer (step 214). In an exemplary embodiment, cognitive agent 124 may transmit, on a continuous or an on-demand basis, the cloud service uptime details to the cloud service consumer by means of a binary bit payload containing an error code. In alternative embodiments, cognitive agent 124 may transmit, by means of a binary bit payload, a more optimal time to send a cloud service request or may send an auto-request at the more optimal time according to the cloud service uptime model.

Figure 5:
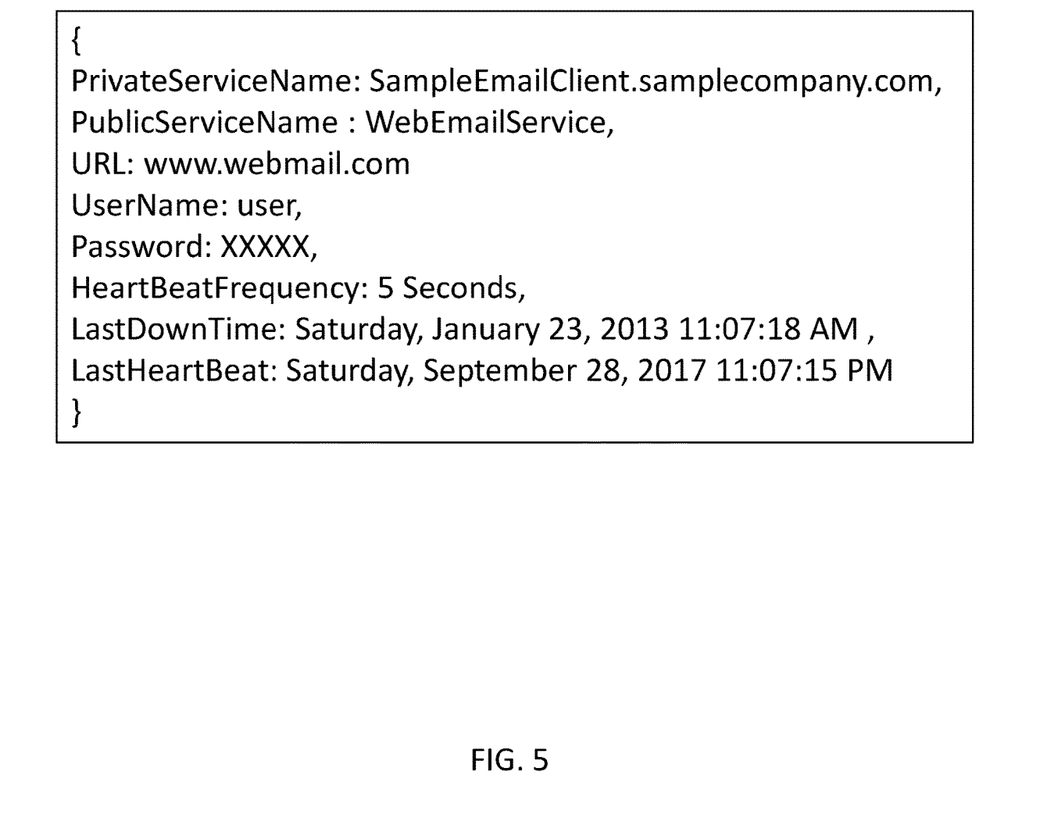
FIG. 5 provides an illustrative example of a cognitive agent 124 reporting the health of a public cloud service 122 API in response to a service up-time call from cloud broker 134, in accordance with an embodiment of the present invention.

FIG. 5 provides an illustrative example of a cognitive agent 124 reporting the health of a public cloud service 122 API in response to a service up-time call from cloud broker 134, in accordance with an embodiment of the present invention. In the illustrative example, cognitive agent 124 may post back HeartBeat response of a public cloud service 122, such as a web-based public email service, from public cloud service provider 120 to cloud brokerage server 130. The HeartBeat response may be posted in JSON format, as it is lightweight (i.e. contains a low payload binary bit response), and more fully depicted in FIG. 5. As can be seen from the HeartBeat response in FIG. 5, cognitive agent 124 is checking for the up-time of the public cloud service 122 every 5 seconds and posting to the private cloud service 132 (e.g. SampleEmailClient.samplecompany.com) that the public cloud service 122 (e.g. the web-based public email service) is up and running and the private client can use the public cloud service 122 to fetch the emails.

In an exemplary embodiment, if the cognitive agent 124 determines that the cloud service uptime for the public cloud service 122 exceeds a given threshold and prevents the cloud service request from the cloud service consumer, then cognitive agent 124 may suggest a later time for provisioning the public cloud service 122 based on the cloud service uptime model.

Referring back to FIGS. 1, 2, and 4, if the cloud service uptime for the public cloud service 122 does not exceed a given threshold (step 210 NO), then cognitive agent 124 allows the cloud service request, by the cloud service consumer, for the provisioning of the cloud service (step 216).

With continued reference to FIGS. 1, 2, and 4, cognitive agent 124 observes the cloud service uptime details for the provisioning of the public cloud service 122 (step 218) and uses the observed cloud service uptime details to further train the cloud service uptime model (step 204). In exemplary embodiments, cloud service uptime details may include a typical use of the public cloud service 122, a typical duration of use of the public cloud service 122, and a typical time of day that the public cloud service 122 is in use on the public cloud service provider 120.

Figure 6:
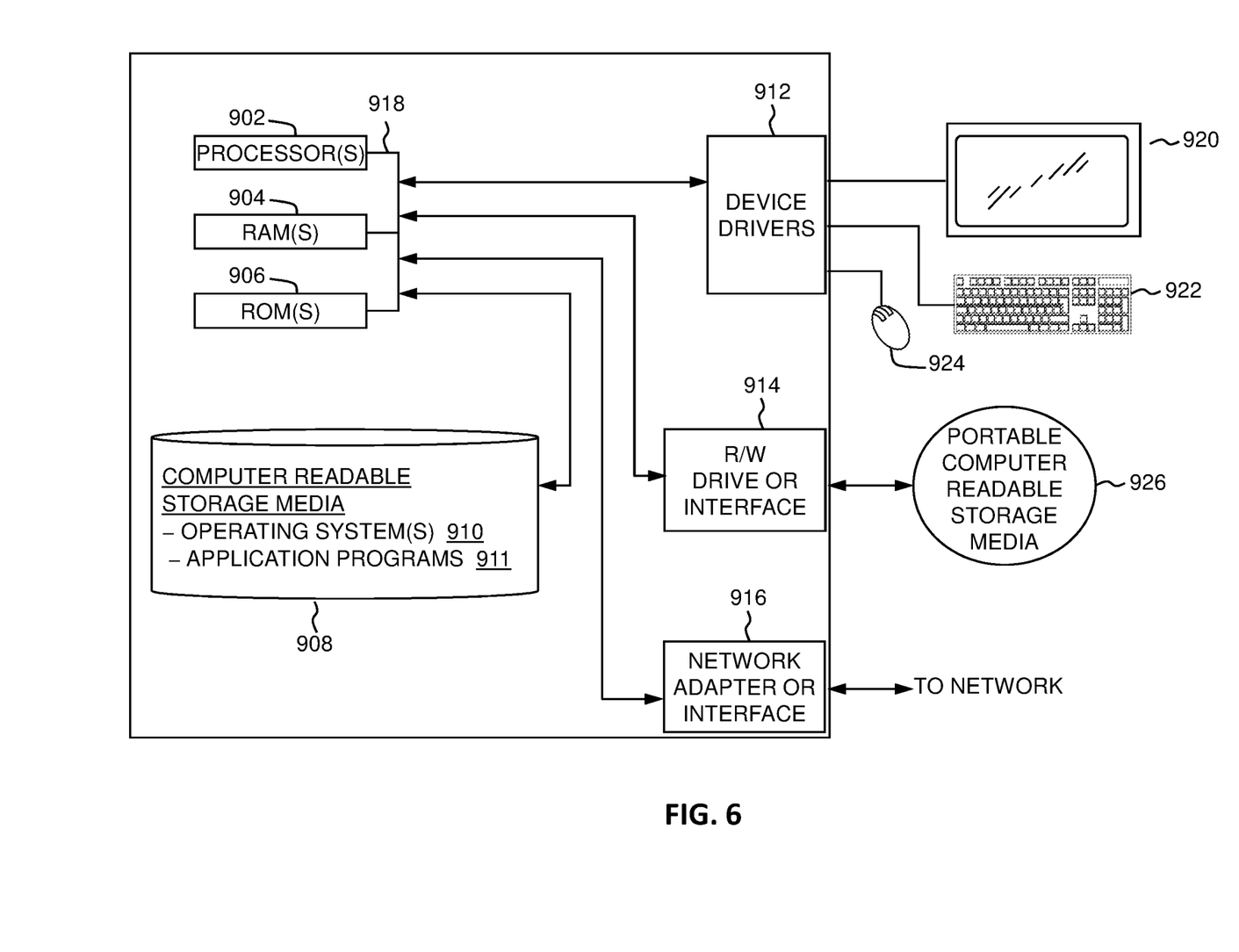
FIG. 6 is a diagram graphically illustrating the hardware components of a computing environment of FIG. 1, in accordance with an embodiment of the present invention.

FIG. 6 is a block diagram depicting components of a computing device (such as consumer computing device 110, public cloud service provider 120, or cloud brokerage server 140, as shown in FIG. 1), in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Consumer computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as cognitive agent 122, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Consumer computing device 110 may also include a R/W drive or interface 914 to read from and write to one or more portable computer readable storage media 926. Application programs 911 on consumer computing device 110 may be stored on one or more of the portable computer readable storage media 926, read via the respective R/W drive or interface 914 and loaded into the respective computer readable storage media 908.

Consumer computing device 110 may also include a network adapter or interface 916, such as a TCP/IP adapter card or wireless communication adapter (such as a 4G wireless communication adapter using OFDMA technology). Application programs 911 on consumer computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Consumer computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
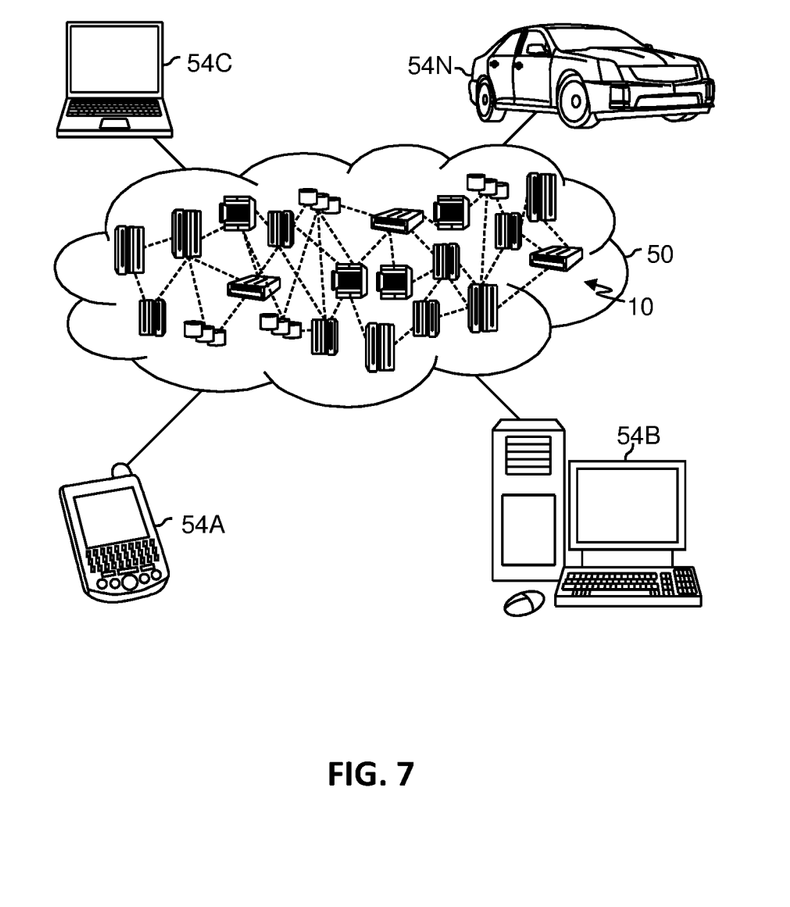
FIG. 7 depicts a cloud computing environment, in accordance with an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
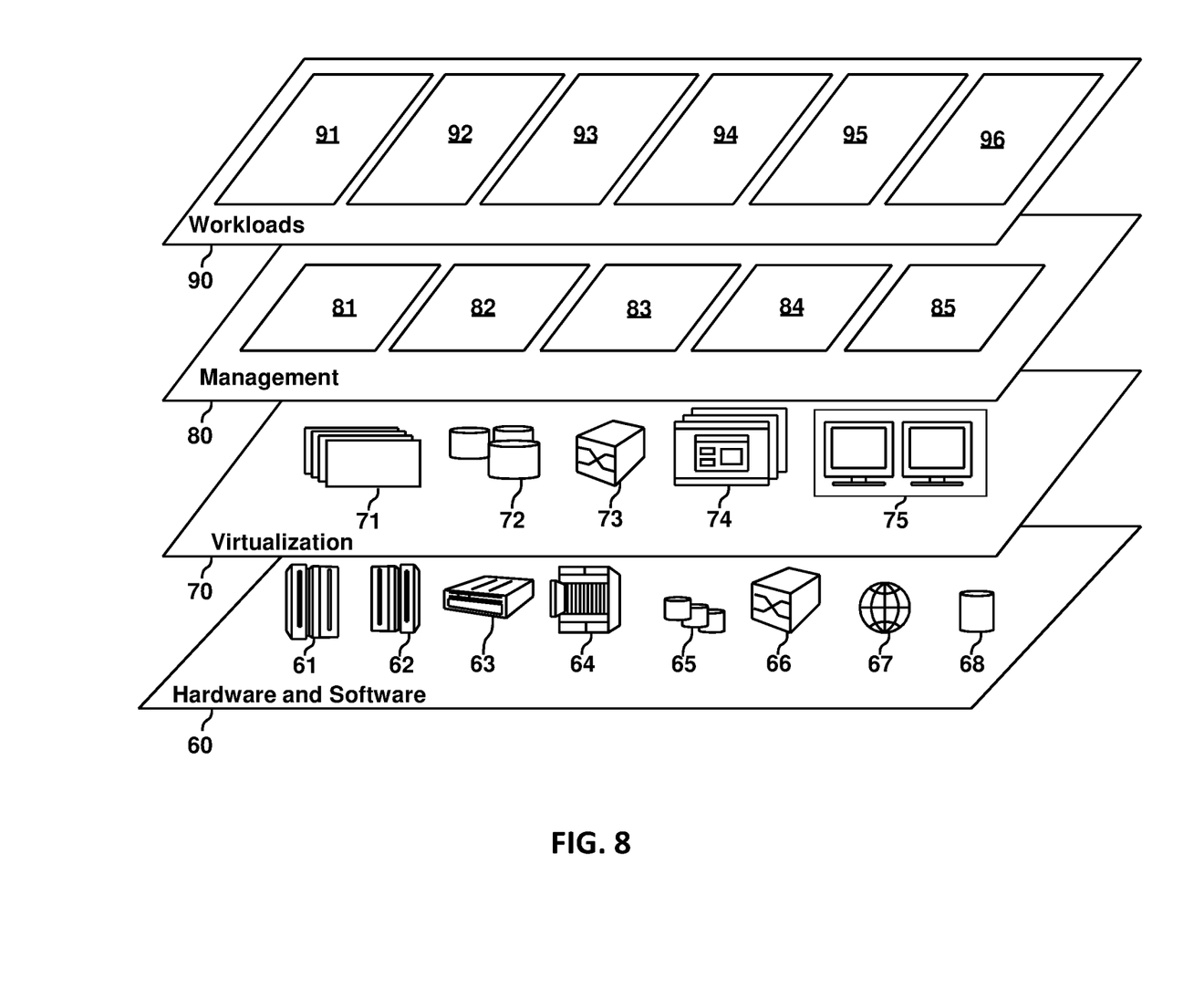
FIG. 8 depicts abstraction model layers of the illustrative cloud computing environment of FIG. 6, in accordance with an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud service uptime processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for detecting a cloud service uptime for a public cloud service on a cloud service provider, by means of a cognitive agent, comprising:
receiving, by the cognitive agent, a cloud service request from a client;
detecting scheduled and unscheduled downtime of the public cloud service, via the cognitive agent, by polling the public cloud service on the cloud service provider at a configurable, or dynamic interval, to know a root cause of one or more cloud service failures in order to avoid multiple round trips to the public cloud;
informing the client, by the cognitive agent, about an availability of the public cloud service before the public cloud service is actually used;
optimizing a caching functionality of the cognitive agent in order to provide an optimal time to re-send the cloud service request from the client, wherein the cognitive agent presents a pattern on how frequent the public cloud service is used, and for how long;
determining the cloud service uptime based on a cloud service uptime model, wherein the cognitive agent utilizes cloud service uptime details to train the cloud service uptime model;
preventing the cloud service request from the client if the cloud service uptime model determines that the cloud service uptime exceeds a given threshold;
transmitting, by the cognitive agent, the optimal time to re-send the cloud service request, from the client, according to the cloud service uptime model; and
sending, by the cognitive agent, an automated cloud service request to the cloud service provider at the optimal time, according to the cloud service uptime model.

2. The computer-implemented method of claim 1, further comprising:
requesting a provisioning of a cloud service if it is determined that the cloud service uptime does not exceed the given threshold.

3. The computer-implemented method of claim 1, further comprising:
suggesting, by the cognitive agent, a later time for provisioning a service, based on the cloud service uptime model.

4. The computer-implemented method of claim 1, further comprising:
training, by the cognitive agent, the cloud service uptime model based on a dynamic polling of the cloud service, wherein the cloud service uptime model provides an optimal response to the client.

5. The computer-implemented method of claim 1, wherein the cognitive agent transmits, on a continuous or an on-demand basis, the cloud service uptime details to the cloud client by means of a binary bit payload containing an error code, if it is determined that the cloud service uptime exceeds the given threshold.

6. The computer-implemented method of claim 1, wherein the cloud service uptime details comprise a typical use of the cloud service, a typical duration of the cloud service, and a typical time of day that the cloud service is in use on the cloud service provider.

7. The computer-implemented method of claim 4, wherein dynamic polling of the cloud service further comprises:
polling one or more different cloud service types at one or more configurable intervals for a typical duration, frequency, and use.

8. A computer program product, comprising a non-transitory tangible storage device having program code embodied therewith, the program code executable by a processor of a computer to perform a method, the method comprising:
receiving, by the cognitive agent, a cloud service request from a client;

detecting scheduled and unscheduled downtime of the public cloud service, via the cognitive agent, by polling the public cloud service on the cloud service provider at a configurable, or dynamic interval, to know a root cause of one or more cloud service failures in order to avoid multiple round trips to the public cloud;

informing the client, by the cognitive agent, about an availability of the public cloud service before the public cloud service is actually used;

optimizing a caching functionality of the cognitive agent in order to provide an optimal time to re-send the cloud service request from the client, wherein the cognitive agent presents a pattern on how frequent the public cloud service is used, and for how long;

determining the cloud service uptime based on a cloud service uptime model, wherein the cognitive agent utilizes cloud service uptime details to train the cloud service uptime model;

preventing the cloud service request from the client if the cloud service uptime model determines that the cloud service uptime exceeds a given threshold;

transmitting, by the cognitive agent, the optimal time to re-send the cloud service request, from the client, according to the cloud service uptime model; and sending, by the cognitive agent, an automated cloud service request to the cloud service provider at the optimal time, according to the cloud service uptime model.

9. The computer program product of claim 8, further comprising:
requesting a provisioning of a cloud service if it is determined that the cloud service uptime does not exceed the given threshold.

10. The computer program product of claim 8, further comprising:
suggesting, by the cognitive agent, a later time for provisioning a service, based on the cloud service uptime model.

11. The computer program product of claim 8, further comprising:
training, by the cognitive agent, the cloud service uptime model based on a dynamic polling of the cloud service, wherein the cloud service uptime model provides an optimal response to the client.

12. The computer program product of claim 8, wherein the cognitive agent transmits, on a continuous or an on-demand basis, the cloud service uptime details to the cloud client by means of a binary bit payload containing an error code, if it is determined that the cloud service uptime exceeds the given threshold.

13. The computer program product of claim 8, wherein the cloud service uptime details comprise a typical use of the cloud service, a typical duration of the cloud service, and a typical time of day that the cloud service is in use on the cloud service provider.

14. The computer program product of claim 11, wherein dynamic polling of the cloud service further comprises:
polling one or more different cloud service types at one or more configurable intervals for a typical duration, frequency, and use.

15. A computer system, comprising:
one or more computer devices each having one or more processors and one or more tangible storage devices; and
a program embodied on at least one of the one or more storage devices, the program having a plurality of program instructions for execution by the one or more processors, the plurality of program instructions comprising instructions for:
receiving, by the cognitive agent, a cloud service request from a client;
detecting scheduled and unscheduled downtime of the public cloud service, via the cognitive agent, by polling the public cloud service on the cloud service provider at a configurable, or dynamic interval, to know a root cause of one or more cloud service failures in order to avoid multiple round trips to the public cloud;
informing the client, by the cognitive agent, about an availability of the public cloud service before the public cloud service is actually used;
optimizing a caching functionality of the cognitive agent in order to provide an optimal time to re-send the cloud service request from the client, wherein the cognitive agent presents a pattern on how frequent the public cloud service is used, and for how long;
determining the cloud service uptime based on a cloud service uptime model, wherein the cognitive agent utilizes cloud service uptime details to train the cloud service uptime model;
preventing the cloud service request from the client if the cloud service uptime model determines that the cloud service uptime exceeds a given threshold;
transmitting, by the cognitive agent, the optimal time to re-send the cloud service request, from the client, according to the cloud service uptime model; and
sending, by the cognitive agent, an automated cloud service request to the cloud service provider at the optimal time, according to the cloud service uptime model.

16. The computer system of claim 15, further comprising:
requesting a provisioning of a cloud service if it is determined that the cloud service uptime does not exceed the given threshold.

17. The computer system of claim 15, further comprising:
suggesting, by the cognitive agent, a later time for provisioning a service, based on the cloud service uptime model.

18. The computer system of claim 15, further comprising:
training, by the cognitive agent, the cloud service uptime model based on a dynamic polling of the cloud service, wherein the cloud service uptime model provides an optimal response to the client.

19. The computer system of claim 15, wherein the cognitive agent transmits, on a continuous or an on-demand basis, the cloud service uptime details to the cloud client by means of a binary bit payload containing an error code, if it is determined that the cloud service uptime exceeds the given threshold.

20. The computer system of claim 15, wherein the cloud service uptime details comprise a typical use of the cloud service, a typical duration of the cloud service, and a typical time of day that the cloud service is in use on the cloud service provider.

* * * * *